(12) United States Patent
Spektor et al.

(10) Patent No.: US 10,652,227 B2
(45) Date of Patent: May 12, 2020

(54) IMPERSONATING TARGET ACCOUNT VIA ACCOUNT REDIRECTION

(71) Applicant: Microsoft Technology Licensing, LLC, Redmond, WA (US)

(72) Inventors: Daron Spektor, Seattle, WA (US); Nicola Greene Alfeo, Seattle, WA (US); Kevin Thomas Brown, Kirkland, WA (US); Harry Phillip Ferguson, IV, Seattle, WA (US); Jeffrey Earl Steinbok, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 199 days.

(21) Appl. No.: 15/597,602

(22) Filed: May 17, 2017

(65) Prior Publication Data
US 2018/0337906 A1    Nov. 22, 2018

(51) Int. Cl.
*H04L 29/06* (2006.01)
*G06F 21/60* (2013.01)
*G06F 21/33* (2013.01)

(52) U.S. Cl.
CPC .............. *H04L 63/08* (2013.01); *G06F 21/33* (2013.01); *G06F 21/604* (2013.01); *G06F 2221/2115* (2013.01); *G06F 2221/2141* (2013.01)

(58) Field of Classification Search
CPC .......... G06F 15/16; G06F 15/173; G06F 7/04; G06F 21/33; G06F 21/604; G06K 5/00; G06Q 40/00; H04L 9/32; H04L 63/08

USPC ............. 726/1, 5, 6; 709/219, 225; 235/380; 358/1.14; 705/36 R; 713/155
See application file for complete search history.

(56) References Cited

U.S. PATENT DOCUMENTS

| | | | |
|---|---|---|---|
| 7,509,497 B2 | 3/2009 | Joy et al. | |
| 7,634,438 B2 * | 12/2009 | Penney | G06Q 20/10 340/5.86 |
| 8,751,648 B2 * | 6/2014 | Scherzer | H04W 12/08 709/220 |
| 8,800,865 B2 * | 8/2014 | Vadhri | G06Q 20/367 235/379 |
| 8,874,696 B1 * | 10/2014 | Daruwalla | H04L 67/1097 709/201 |
| 9,268,917 B1 | 2/2016 | Barak et al. | |
| 9,497,184 B2 * | 11/2016 | Fork | G06F 21/33 |

(Continued)

OTHER PUBLICATIONS

"International Search Report and Written Opinion in PCT Application No. PCT/US2018/027699", dated Jul. 2, 2018, 12 Pages.

(Continued)

*Primary Examiner* — Thanhnga B Truong

(57) ABSTRACT

Aspects of the present disclosure relate to systems and methods for impersonating target user accounts via account redirection. In one aspect, a request may be received at a service issued from a temporary account of the service accessed by a client application. It may be determined whether the temporary account is stored in a mapping table comprising one or more temporary accounts mapped to a corresponding impersonation token. When it is determined that the temporary account is stored in the mapping table, the corresponding impersonation token mapped to the temporary account may be identified. The request may be processed in an impersonation mode based on the identified impersonation token.

20 Claims, 5 Drawing Sheets

(56) References Cited

U.S. PATENT DOCUMENTS

| | | | |
|---|---|---|---|
| 2010/0154043 A1 | 6/2010 | Castellucci et al. | |
| 2013/0086670 A1 | 4/2013 | Vangpat et al. | |
| 2014/0366080 A1* | 12/2014 | Gupta | H04L 63/0807 |
| | | | 726/1 |
| 2015/0082372 A1 | 3/2015 | Kottahachchi et al. | |
| 2015/0146231 A1* | 5/2015 | Austin | G06F 3/1222 |
| | | | 358/1.14 |
| 2015/0312038 A1* | 10/2015 | Palanisamy | H04L 9/3213 |
| | | | 713/155 |

OTHER PUBLICATIONS

"Impersonation and EWS in Exchange", https://msdn.microsoft.com/en-us/library/office/dn722377(v=exchg.150).aspx, Published on: May 5, 2014, 2 pages.

"Impersonate a client after authentication", https://technet.microsoft.com/en-us/library/dn221967(v=ws.11).aspx, Published on: May 8, 2013, 4 pages.

Gupta, Atul, "Infosys | Microsoft", http://www.infosysblogs.com/microsoft/2009/02/impersonation_and_delegation_t.html, Published on: Feb. 4, 2009, 2 pages.

"Using OAuth 2.0 for Server to Server Applications", https://developers.google.com/api-client-library/php/auth/service-accounts, Published on: Oct. 5, 2016, 6 pages.

"Impersonation", http://web.archive.org/web/20100529041423/http://technet.microsoft.com/en-us/library/cc961980.aspx, Published on: May 29, 2010, 5 pages.

"How Access Tokens Work", https://technet.microsoft.com/en-us/library/cc783557(v=ws.10).aspx, Published on: Mar. 28, 2003, 11 pages.

"How to: Configure impersonation", https://msdn.microsoft.com/en-us/library/office/dn722376(v=exchg.150).aspx, Published on: May 5, 2014, 2 pages.

* cited by examiner

IMPERSONATING TARGET ACCOUNT VIA ACCOUNT REDIRECTION

BACKGROUND

Administrators of applications and/or services may evaluate a customer issue by debugging the customer's application. For example, an administrator may be issued an authorization token for accessing a customer's account associated with the application. The authorization token gives the administrator certain access permissions and/or rights to the customer's account. Current techniques for issuing and/or creating an authorization token include applying the authorization token to headers of HTTPS requests to a service to indicate that the incoming caller has rights to impersonate a customer for a given session. However, this technique requires custom work on every client and/or client application to support the ingestion. As such, current techniques for issuing and/or creating an authorization token for an administrator to impersonate a customer may be inefficient, time consuming, and require many resources.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to systems and methods for impersonating target accounts via account redirection. In one aspect, a request may be received at a service issued from a temporary account of the service accessed by a client application. It may be determined whether the temporary account is stored in a mapping table comprising one or more temporary accounts mapped to a corresponding impersonation token. When it is determined that the temporary account is stored in the mapping table, the corresponding impersonation token mapped to the temporary account may be identified. The request may be processed in an impersonation mode based on the identified impersonation token.

In another aspect, a method for impersonating a target account of a service accessed by a client application is provided. In one aspect, a request is received at the service issued from a temporary account of the service accessed by the client application. A mapping table is searched for the temporary account. In one example, the mapping table includes one or more temporary accounts mapped to a corresponding impersonation token. When the temporary account is identified in the mapping table, the corresponding impersonation token mapped to the temporary account is identified. The request is processed in an impersonation mode based on the identified impersonation token.

In yet another aspect, a request may be received at a registration component for granting an administrator access rights to a target account of a service accessed by a client application. The administrator may be granted access rights to the target account. A temporary account of the service may be mapped to the target account having the associated administrator access rights. The mapping between the temporary account and the target account having the associated administrator access rights may be stored in a mapping table of the registration component.

DESCRIPTION OF THE DRAWINGS

The detailed description is made with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
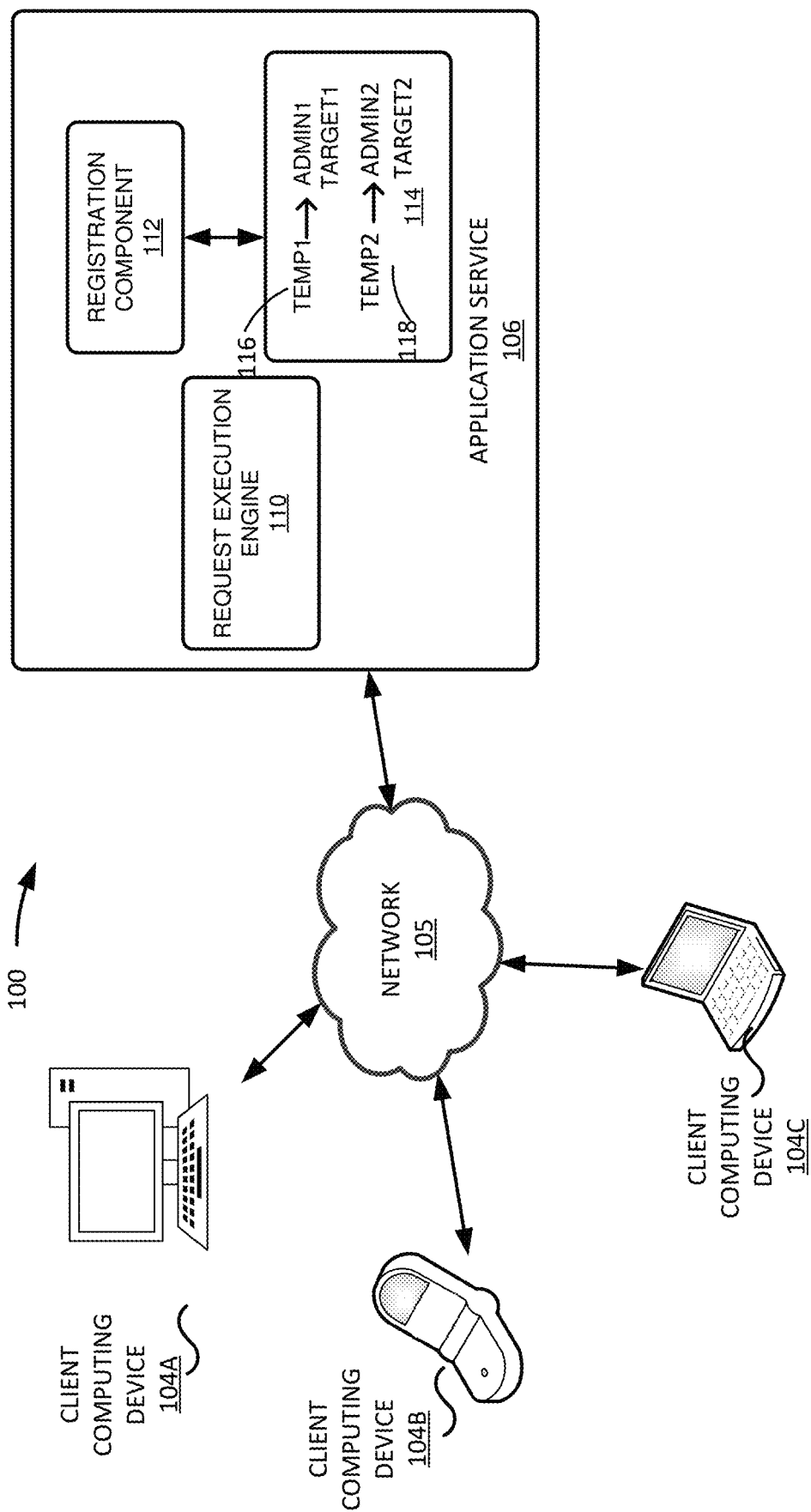
FIG. 1 illustrates an exemplary impersonation system for impersonating target user accounts via account redirection, according to an example aspect.

Aspects of the disclosure are generally directed to impersonating target user accounts via account redirection. For example, a third-party account may be created and/or assigned to an administrator for impersonating a customer account. In one example, the third-party account may be temporarily assigned to an administrator from a plurality of temporary accounts stored at a service. The temporary account is a standard user account that would be created by any user of a client application. In one example, the temporary account is mapped to the customer/target account that requires administrative support. For example, a mapping between the administrator and the target account that indicates the administrator has authorization to access the target account may be stored in a mapping table at the service. In this regard, the temporary account may be mapped to the mapping between the administrator and the target account. In another example, an impersonation token granting the administrator access rights to the target account may be stored in a mapping table at the service. In this regard, the temporary account may be mapped to the impersonation token. As such, the administrator may issue a request to the service using the temporary account. The service may search the mapping table for the temporary account and identify the impersonation token and/or the mapping between the administrator and the target account that is mapped to the temporary account that issued the request. When a mapping between the temporary account and an impersonation token, for example, is identified in the mapping table, the service may process the request in an impersonation mode. The impersonation mode may configure the service to process the request as if the request is issued from the target account while granting the administrator access rights to the target account. As such, the administrator can debug and/or evaluate the issue associated with the target/customer account via the temporary/third party account.

As discussed above, current techniques for issuing and/or creating an authorization token include applying the authorization token to headers of HTTPS requests to a service to indicate that the incoming caller has rights to impersonate a customer for a given session. However, this technique requires custom work on every client and/or client application to support the ingestion. As such, current techniques for issuing and/or creating an authorization token for an administrator to impersonate a customer may be inefficient, time consuming, and require many resources. Accordingly, aspects described herein include techniques for impersonating target user accounts via account redirection efficiently, from any client device without making changes to the client device, and to facilitate access patterns using client applications that are more like the access patterns of the client application when used by the customer/target user. For example, a temporary account may be configured such that an administrator is granted access rights to a target account (e.g., a customer). In one example, a request may be received at a service for granting an administrator access rights to a target account of the service accessed by a client application. In response to receiving the request, the administrator may be granted access rights to the target account. For example, the administrator may be mapped to the target account in a mapping table. In another example, an impersonation token may be created that indicates the administrator has access rights to the target account. In some examples, the impersonation token may be stored in the mapping table. In one example, a temporary account may be created for the administrator. In another example, a temporary account from a plurality of stored temporary accounts may be assigned to the administrator. Subsequent to the temporary account being created for and/or assigned to the administrator, the temporary account of the service may be mapped to the target account having the associated administrator access rights. The mapping between the temporary account and the target account having the associated administrator access rights may be stored in a mapping table at the service.

In another aspect, the administrator may impersonate the target account of the service accessed by a client application via the configured temporary account. For example, a request is received at the service issued from the temporary account of the service accessed by the client application. The mapping table is searched for the temporary account. In one example, the mapping table includes one or more temporary accounts mapped to a corresponding impersonation token. When the temporary account is identified in the mapping table, the corresponding impersonation token mapped to the temporary account is identified. The request is processed in an impersonation mode based on the identified impersonation token. The impersonation mode may configure the service to process the request as if the request is issued from the target account while granting the administrator access rights to the target account. As such, the administrator can debug and/or evaluate the issue associated with the target/customer account via the temporary/third party account.

As such, a technical effect that may be appreciated is that by impersonating target user accounts via account redirection, less resources may be used, processor load may be reduced, and memory may be conserved (e.g., no changes are required at the client computing device); ultimately improving the functioning of the computer itself. Another technical effect that may be appreciated is that impersonating target user accounts via account redirection facilitates control over who has access to a customer's data using a third-party account by only allowing people who have access to the third-party account access to the customer's data; ultimately improving process security. Yet another technical effect that may be appreciated is that customer support and debugging of customer issues is improved by facilitating access patterns using client applications that are more like the access patterns of the client application when used by the customer/target user.

Referring now to the drawings, in which like numerals represent like elements through the several figures, aspects of the present disclosure and the exemplary operating environment will be described. With reference to FIG. 1, one aspect of an impersonation system 100 for impersonating target user accounts via account redirection is illustrated. The impersonation system 100 may include a client computing devices 104A-104C and a service 106. In aspects, the impersonation system 100 may be implemented on one or more of the client computing devices 104A-104C. In a basic configuration, the client computing devices 104A-104C are handheld computers having both input elements and output elements. The client computing devices 104A-104C may be any suitable computing device for implementing the impersonation system 100 for impersonating target user accounts via account redirection. For example, the client computing devices 104A-104C may be at least one of: a mobile telephone; a smart phone; a tablet; a phablet; a smart watch; a wearable computer; a personal computer; a desktop computer; a laptop computer; a gaming device/computer (e.g., Xbox); a television; and etc. This list is exemplary only and should not be considered as limiting. Any suitable client computing devices 104A-104C for implementing the impersonation system 100 for impersonating target user accounts via account redirection may be utilized.

In aspects, the impersonation system 100 may be implemented in the service 106. In one example, the service 106 may include a cloud service such as OneDrive, SharePoint, Google Drive, Dropbox, and the like. The service 106 may provide data to and from the client computing devices 104A-104C through a network 105, for example. In aspects, the impersonation system 100 may be implemented on more than one service 106, such as a plurality of services 106. As discussed above, the service 106 may provide data to and from the client computing devices 104A-104C through the network 105. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums. In another aspect, the impersonation system 100 may be implemented as a web-based application. In one example, the web-based application may include any client-server software application where the client (e.g., user interface) runs in a web-browser and/or any component capable of rendering HTML, Flash, Silverlight, and the like.

In some aspects, the client computing devices 104A-104C may issue one or more requests to the service 106. For example, a user and/or a plurality of users of the client computing devices 104A-104C may launch a client application associated with the service 106 (e.g., a client application for accessing and engaging the service 106). In some examples, the client application is at least one of a mobile application, a sync client, a partner application, and a web application. For example, a mobile application may include an application that is downloaded on a mobile device, for example. In this regard, the mobile application can include an application for a plurality of mobile device operating systems such as Windows®, Android®, iOS®, and the like. The sync client may be integrated with a file explorer of the client computing devices 104A-104C for accessing files stored on the client computing devices 104A-104C and/or the service 106. The partner application may include any application suitable to access and having authority to access the service 106. The web application may include a website for accessing the service 106 (e.g., using a browser to access the service 106 via a website of the service 106).

As illustrated in FIG. 1, the service 106 includes a request execution engine 110, a registration component 112, and a mapping table 114. In some examples, the registration component 112 may be a separate component and/or may be located separate from the service 106. In some examples, the mapping table 114 is part of the registration component 112. In other examples, the mapping table 114 is a separate component and/or may be located separate from the registration component 112. The request execution engine 110 may be configured to process and execute requests from the client computing devices 104A-104C. In some examples, the request execution engine 110 and/or the service 106 may be configured to operate in an impersonation mode. In one example, the impersonation mode may include configuring the request execution engine 110 and/or the service 106 to operate as an administrator impersonating a target user (e.g., a customer). For example, the request execution engine 110 may process and execute a request as if an administrator has access rights to (e.g., is impersonating) a target user (e.g., customer). In another example, the impersonation mode may include configuring the request execution engine 110 and/or the service 106 to operate as a target user. For example, request execution engine 110 and/or the service 106 may process and execute a request as if the request is issued from the target user. In another example, the impersonation mode may include exchanging an authorization token associated with a temporary user account with an impersonation token. For example, request execution engine 110 and/or the service 106 may process and execute a request as if the request includes the impersonation token.

In examples, the registration component 112 may be configured to register and/or configure temporary accounts associated with the client applications discussed herein. For example, a temporary account associated with a client application may be configured such that an administrator is granted access rights to a target account (e.g., a customer) associated with the client application. In one example, a temporary account is a standard user account that would be created by any user of a client application. For example, the temporary account is created using a standard identifier and password. In one example, an administrator may send a request to the service 106 and/or the registration component 112 for granting the administrator access rights to a target account of the service accessed by a client application 106. The target account may be a customer account that requires debugging and/or support from an administrator. For example, a customer using a client application associated with the service 106 may be experiencing an issue while using the client application. When the service 106 and/or the registration component 112 receives the request, the administrator may be granted access rights to the target account. For example, the administrator may be mapped to the target account in the mapping table 114 indicating that the administrator has access rights to the target account. In another example, an impersonation token may be created that indicates the administrator has access rights to the target account. In some examples, the impersonation token may be stored in the mapping table 114.

In one example, when the administrator is granted access rights to the target account, a temporary account may be created for the administrator. In another example, when the administrator is granted access rights to the target account, a temporary account from a plurality of stored temporary accounts may be assigned to the administrator. Subsequent to the temporary account being created for and/or assigned to the administrator, the temporary account of the service may be mapped to the target account having the associated administrator access rights. The mapping between the temporary account and the target account having the associated administrator access rights may be stored in the mapping table 114 at the service 106. For example, as illustrated in FIG. 1, the mapping table 114 includes a mapping 116 between a temporary account "Temp1" and the target account "Target1" having associated administrator access rights "Admin1". In another implementation, an impersonation token is created for the target account "Target1" having associated administrator access rights "Admin1". In this implementation, the mapping 116 is between the temporary account "Temp1" and the impersonation token "Admin1 impersonating Target1". In another example, the mapping table 114 includes a mapping 118 between a temporary account "Temp2" and the target account "Target2" having associated administrator access rights "Admin2" In another implementation, an impersonation token is created for the target account "Target2" having associated administrator access rights "Admin2". In this implementation, the mapping 118 is between the temporary account "Temp2" and the impersonation token "Admin2 impersonating Target2". It is appreciated that while mapping 116 and mapping 118 are illustrated in the mapping table 114, any number of mappings between temporary accounts and at least one of a corresponding target account having associated administrator access rights and a corresponding impersonation token may be stored in the mapping table 114.

In some examples, the temporary account may be provided to the administrator. For example, when the temporary account is created for and/or assigned to the administrator and mapped to at least one of a corresponding target account having associated administrator access rights and a corresponding impersonation token in the mapping table 114, the temporary account may be proved to the administrator. In one example, the administrator may use the temporary account to debug an issue associated with the target account. In this regard, the administrator may launch an instance of the client application used with the target account that requires support. For example, a customer associated with the target account that requires support may use a client application on the client computing device 104A. The administrator may use the client application on the client computing device 104B. To illustrate, the client computing devices 104A-104B may be mobile devices including at least one mobile application. In this example, the mobile application associated with the target account on the client computing device 104A that requires support may be launched on the client computing device 104B using the credentials of the temporary account. In this regard, the administrator may log into an identity provider associated with the service 106 using the credentials provided with the temporary account. The identity provider may issue an authorization token for the temporary account. The administrator, using the client application, may issue a request to the service 106. The request issued to the service 106 includes the authorization token for the temporary account.

In examples, the request is received at the service 106 issued from the temporary account of the service via the client application. In response to receiving the request at the service 106, the service 106 may determine whether the temporary account is stored in the mapping table 114. For example, the service 106 may search the mapping table 114 for the temporary account. When it is determined that the temporary account is stored in the mapping table 114 (e.g., when the temporary account is identified in the mapping table 114), the target account with associated administrator access rights and/or the impersonation token mapped to the temporary account is identified. When the mapping between the temporary account and the target account with associated administrator access rights and/or the impersonation token is identified, the request may be processed by the service 106 (e.g., via the request execution engine 110) in an impersonation mode based on the identified mapping between the temporary account and the target account with the associated administrator access rights and/or the impersonation token.

As discussed above, in one example, the impersonation mode may include configuring the request execution engine 110 and/or the service 106 to operate as an administrator impersonating a target user (e.g., a customer). For example, the request execution engine 110 may process and execute the request as if the administrator has access rights to (e.g., is impersonating) the target user/account (e.g., customer). In another example, the impersonation mode may include configuring the request execution engine 110 and/or the service 106 to operate as a target user. For example, request execution engine 110 and/or the service 106 may process and execute the request as if the request is issued from the target user/account. In another example, the impersonation mode may include exchanging the authorization token associated with the temporary account (e.g., the authorization token provided in the request) with the impersonation token (e.g., the impersonation token mapped to the temporary account in the mapping table 114). For example, request execution engine 110 and/or the service 106 may process and execute the request as if the request includes the impersonation token (e.g., instead of the authorization token initially provided in the request). As such, the administrator can debug and/or evaluate the issue associated with the target/customer account using the target/customer account (e.g., via the temporary account redirection) without requiring any changes or modifications to the client application.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval, and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 2:
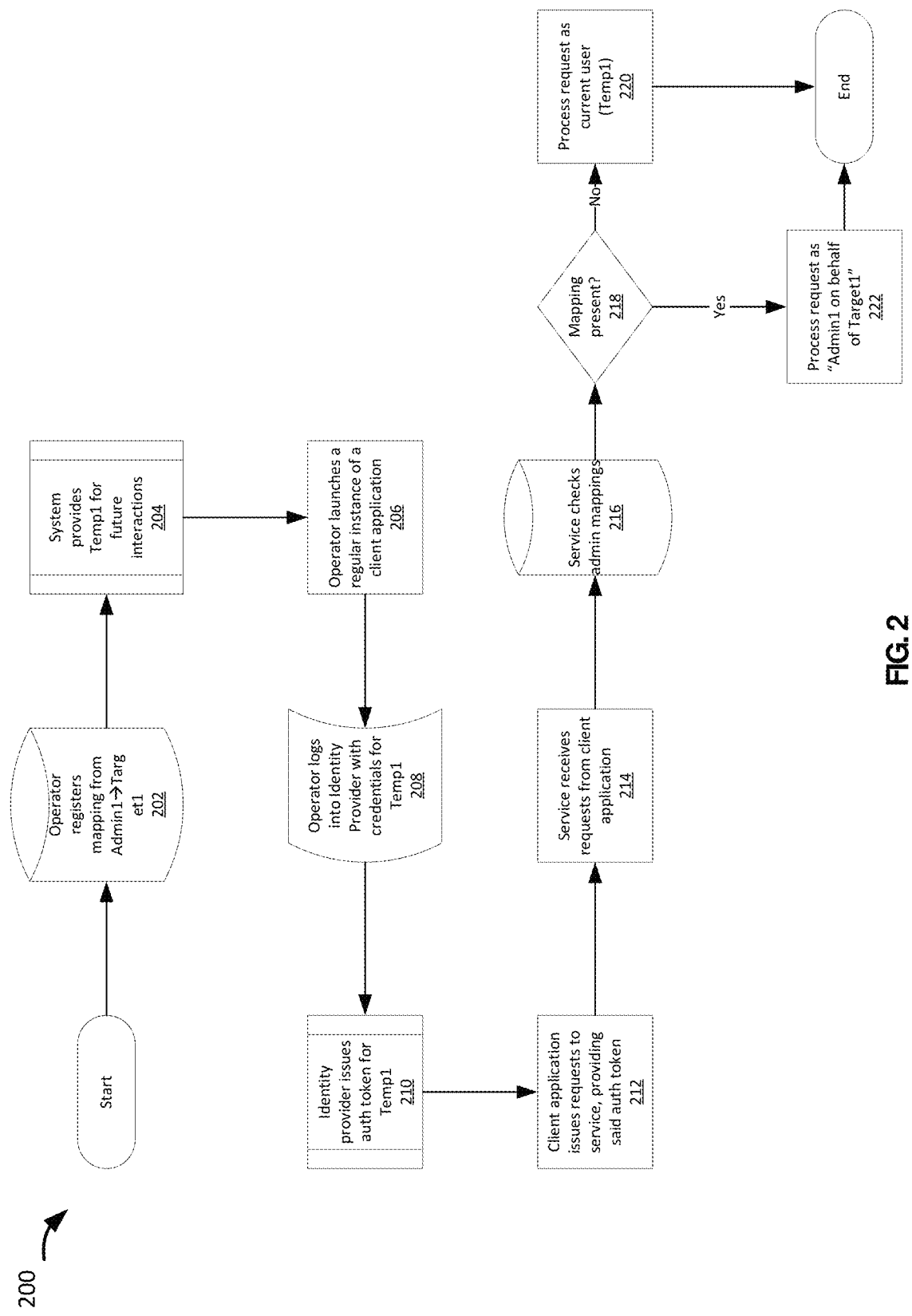
FIG. 2 illustrates an exemplary impersonation process for impersonating target user accounts via account redirection, according to an example aspect.

With reference now to FIG. 2 an impersonation process 200 for impersonating target user accounts via account redirection, according to an example aspect is illustrated. In one example, the impersonation process 200 begins at operation 202 where an administrator (e.g., an operator) of a service may register a mapping from the administrator to a target user/account. For example, the mapping from the administrator to the target account may grant the administrator access rights to the target account. In one example, at operation 202 the administrator may send a request to a registration component for granting the administrator access rights to the target account of the service accessed by a client application. In one example, the mapping from the administrator to the target account may be stored in a mapping table. At operation 204, the service and/or registration component may provide a temporary account to the administrator for future interactions with the client application associated with the service. For example, a temporary account may be created for the administrator. In another example, a temporary account may be assigned to the administrator from a plurality of stored temporary accounts. In one example, the provided temporary account is mapped to the mapping from the administrator to the target account and stored in the mapping table.

At operation 206, the administrator may launch an instance of a client application associated with the service for which the administrator manages and/or operates. When the administrator launches the instance of the client application, the administrator may log into an identity provider associated with the service using the credentials provided with the temporary account at operation 208. At operation 210, the identity provider may issue an authorization token for the temporary account. For example, the authorization token may give the administrator access to the service via the temporary account. At operation 212, the client application may issue a request to the service. As discussed above, the client application may be at least one of a mobile application, a sync client, a partner application, and a web application. The request issued to the service includes the authorization token for the temporary account.

At operation 214, the request is received at the service. The request is issued from the client application (e.g., including the credentials associated with the temporary account). In response to receiving the request at the service, at operation 216, the service may check the mapping table for administrator and/or temporary account mappings. For example, the service may search the mapping table for the temporary account (e.g., the credentials) provided with the request. At operation 218, it is determined whether a mapping between the temporary account and the target account with associated administrator access rights is stored in the mapping table. When a mapping between the temporary account and the target account with associated administrator access rights is not stored in the mapping table, the request is processed as the current user (e.g., with the credentials of the temporary account) at operation 220.

When a mapping between the temporary account and the target account with associated administrator access rights is stored in the mapping table, the request is processed by the service in an impersonation mode based on the identified mapping between the temporary account and the target account with the associated administrator access rights at operation 222. In one example, the impersonation mode may include configuring the service to operate as an administrator impersonating a target account/user (e.g., a customer). For example, the service may process and execute the request as if the administrator has access rights to (e.g., is impersonating) the target user/account (e.g., customer). In another example, the impersonation mode may include configuring the service to operate as the target user. For example, the service may process and execute the request as if the request is issued from the target user/account. In another example, the impersonation mode may include exchanging the authorization token associated with the temporary account (e.g., the authorization token provided in the request) with an impersonation token (e.g., an impersonation token mapped to the temporary account in the mapping table). In one example, the impersonation token grants the administrator access rights to the target account (e.g., from operation 202). For example, the service may process and execute the request as if the request includes the impersonation token (e.g., instead of the authorization token provided in the request from operation 212).

Figure 3:
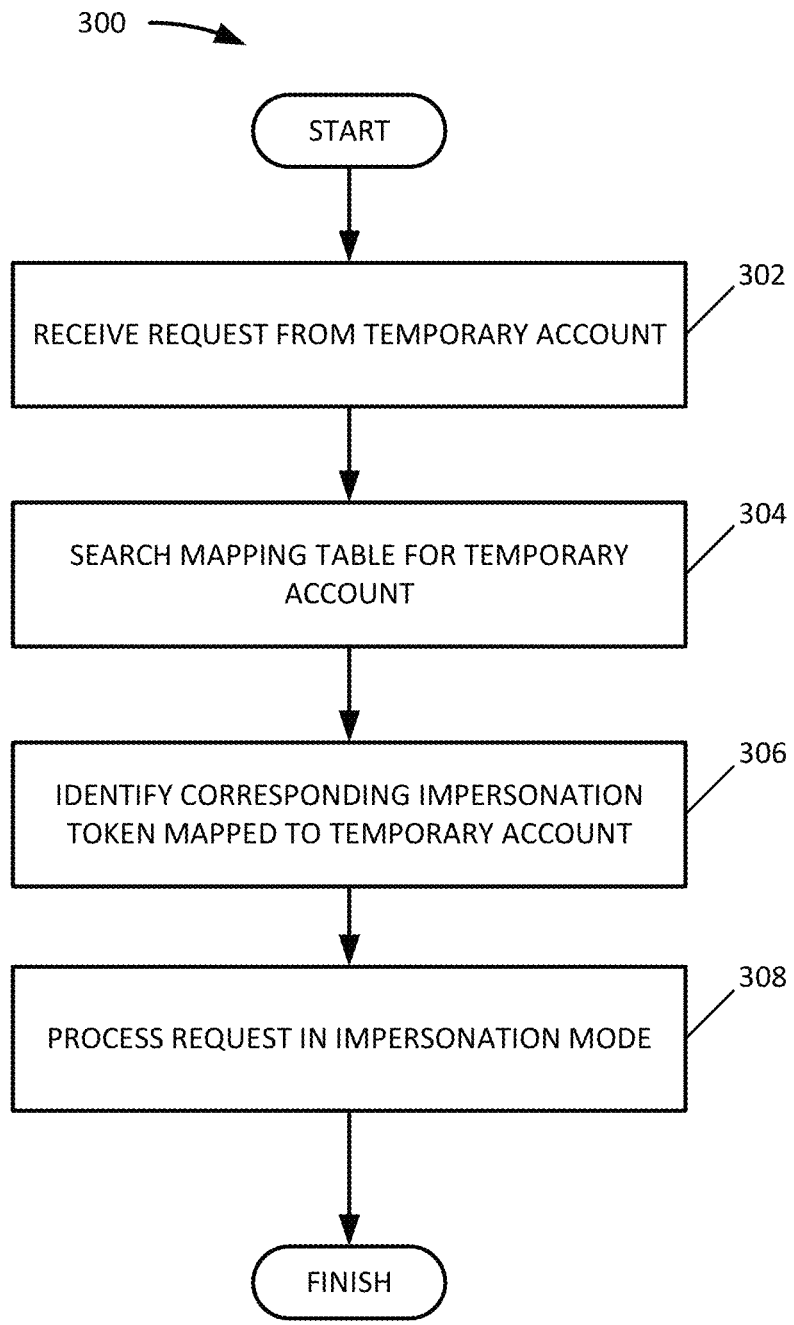
FIG. 3 illustrates an exemplary method for impersonating a target account of a service accessed by a client application, according to an example aspect.

Referring now to FIG. 3, an exemplary method 300 for impersonating a target account of a service accessed by a client application, according to an example aspect is shown. Method 300 may be implemented on a computing device or a similar electronic device capable of executing instructions through at least one processor. Method 300 may begin at operation 302, where a request is received at the service issued from a temporary account of the service accessed by the client application. In one example, the client application may be at least one of a mobile application, a sync client, a partner application, and a web application. In one example, the service may include a cloud service such as OneDrive and SharePoint. As such, in some examples, the client application may include a OneDrive application and/or a SharePoint application. In one example, the temporary account is an account created for accessing the service via the client application. In this regard, the temporary account may include standard credentials such as an identifier and password. In some cases, the temporary account may be created for an administrator of the service. In another example, a temporary account from a plurality of stored temporary accounts may be assigned to an administrator of the service. In this regard, the request issued from the temporary account includes credentials (e.g., an authorization token) for the temporary account.

When a request is received at the service issued from a temporary account of the service accessed by the client application, flow proceeds to operation 304 where a mapping table is searched for the temporary account. In one example, the mapping table includes one or more temporary accounts mapped to a corresponding impersonation token. For example, each temporary account stored in the mapping table may be mapped to a corresponding impersonation token. In one example, the impersonation token grants an administrator of the service access rights to a target account. In one example, access rights to the target account may give the administrator access to the data associated with the target account and/or any capabilities of the target account. In another example, access rights to the target account may give the administrator access to a limited set of data associated with the target account and/or a limited set of capabilities of the target account.

When the temporary account is identified in the mapping table, flow proceeds to operation 306 where the corresponding impersonation token mapped to the temporary account is identified. For example, the impersonation token may include a mapping from the administrator to a target account indicating that the administrator has access rights to the target account. In one example, the temporary account is mapped to the customer/target account that requires administrative support. For example, a mapping between the administrator and the target account that indicates the administrator has authorization to access the target account may be stored in the mapping table at the service. In this regard, the temporary account may be mapped to the mapping between the administrator and the target account (e.g., instead of an impersonation token).

When the corresponding impersonation token mapped to the temporary account is identified, flow proceeds to operation 308 where the request is processed in an impersonation mode based on the identified impersonation token. The impersonation mode may configure the service to process the request as if the request is issued from the target account while granting the administrator access rights to the target account. In one example, the impersonation mode may include configuring the request execution engine and/or the service to operate as an administrator impersonating a target user (e.g., a customer). For example, the request execution engine may process and execute a request as if an administrator has access rights to (e.g., is impersonating) a target user (e.g., customer). In another example, the impersonation mode may include configuring the request execution engine and/or the service to operate as a target user. For example, request execution engine and/or the service may process and execute a request as if the request is issued from the target user. In another example, the impersonation mode may include exchanging an authorization token associated with a temporary user account with an impersonation token. For example, request execution engine and/or the service may process and execute a request as if the request includes the impersonation token.

Figure 4:
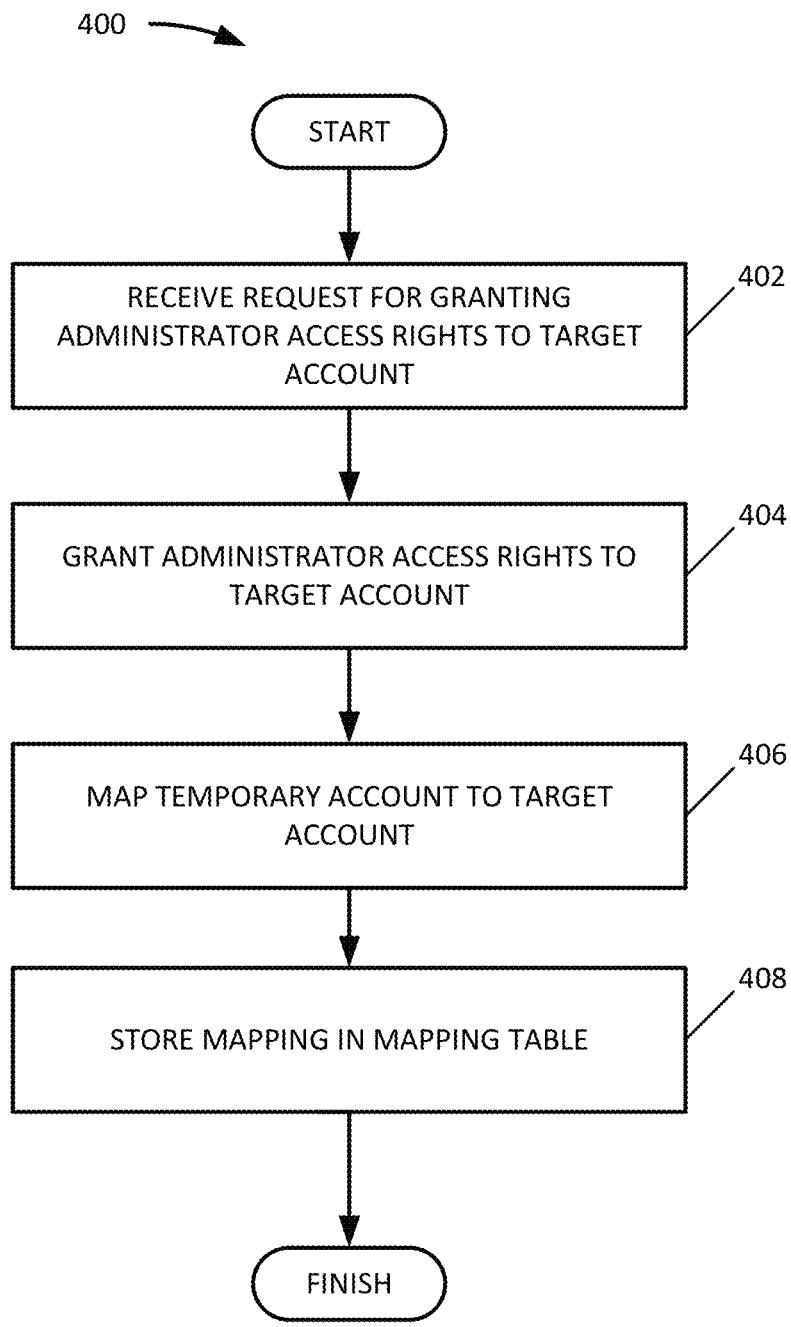
FIG. 4 illustrates an exemplary method for configuring a temporary account, according to an example aspect.

Referring now to FIG. 4, an exemplary method 400 for configuring a temporary account, according to an example aspect is shown. Method 400 may be implemented on a computing device or a similar electronic device capable of executing instructions through at least one processor. Method 400 may begin at operation 402, where a request is received at a registration component for granting an administrator access rights to a target account of a service accessed by a client application. An administrator may include an operator of the service for debugging issues associated with the service and/or providing customer support. In one example, the registration component is located at the service. In another example, the registration component is separate from the service. The registration component may be configured to grant an administrator access rights to a target account, register a mapping between the administrator and the target account, create a temporary account, assign a temporary account to the administrator, and/or register a mapping between a temporary account and an impersonation token and/or a mapping between a temporary account and an administrator mapped to the target account.

When a request is received at a registration component for granting an administrator access rights to a target account of a service accessed by a client application, flow proceeds to operation 404 where the administrator is granted access rights to the target account. In one example, granting the administrator access rights to the target account comprises creating an authorization token. In another example, granting the administrator access rights to the target account comprises storing a mapping between the administrator and the target account that indicates the administrator has access rights to the target account.

When the administrator is granted access rights to the target account, flow proceeds to operation 406 where a temporary account of the service is mapped to the target account having the associated administrator access rights. In one example, the temporary account is an account created for accessing the service via the client application. In this regard, the temporary account may include standard credentials such as an identifier and password. In some cases, the temporary account may be created for an administrator of the service. In another example, a temporary account from a plurality of stored temporary accounts may be assigned to an administrator of the service. In this regard, when the administrator is granted access rights to the target account, a newly created temporary account may be mapped to the target account having the associated administrator access rights. In another example, when the administrator is granted access right to the target account, a temporary account from a pool (e.g., storage) of temporary accounts may be assigned to the administrator and mapped to the target account having the associated administrator access rights such that the temporary account and the target account having the associated administrator access rights are linked. Subsequent to the mapping, the temporary account may be provided (e.g., returned) to the administrator.

When a temporary account of the service is mapped to the target account having the associated administrator access rights, flow proceeds to operation 408 where the mapping between the temporary account and the target account having the associated administrator access rights is stored in a mapping table of the registration component. In one example, the mapping table includes one or more temporary accounts mapped to a corresponding target account having the associated administrator access rights. For example, each temporary account stored in the mapping table may be mapped to a corresponding target account having the associated administrator access rights. In one example, access rights to the target account may give the administrator access to the data associated with the target account and/or any capabilities of the target account. In another example, access rights to the target account may give the administrator access to a limited set of data associated with the target account and/or a limited set of capabilities of the target account. In one example, access rights may allow the administrator to access and see the target account as if the administrator logged into the target account using the credentials provided for the target account.

Figure 5:
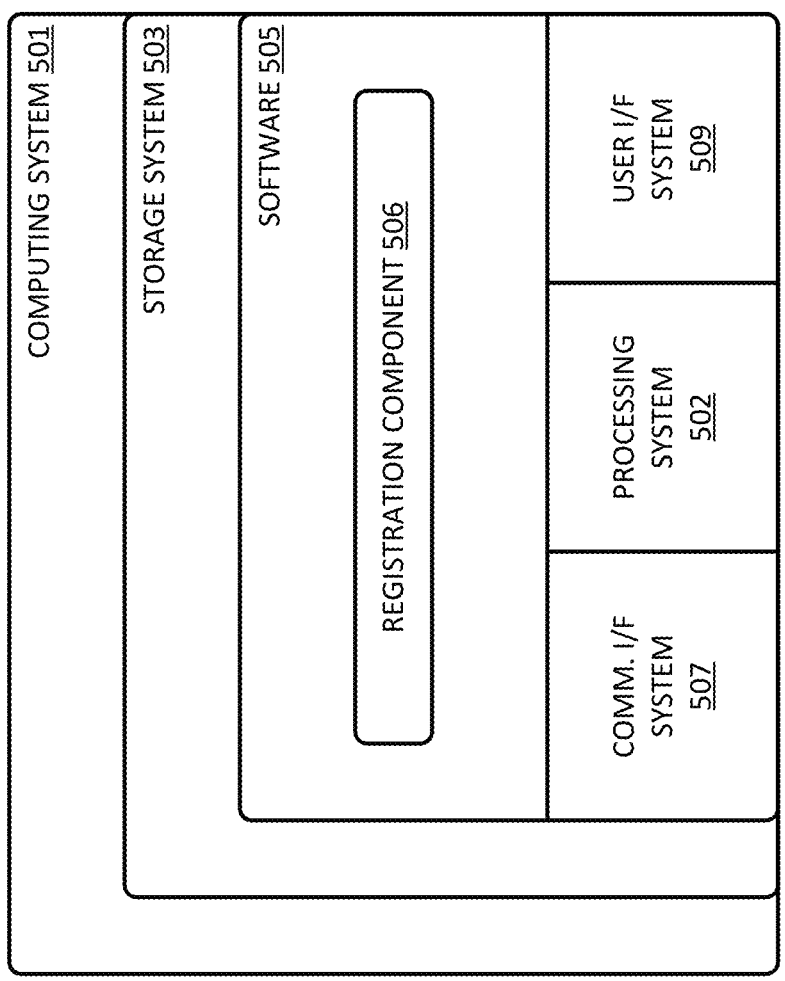
FIG. 5 illustrates a computing system suitable for implementing the enhanced impersonation technology disclosed herein, including any of the environments, architectures, elements, processes, user interfaces, and operational scenarios and sequences illustrated in the Figures and discussed below in the Technical Disclosure.

FIG. 5 illustrates computing system 501 that is representative of any system or collection of systems in which the various applications, services, scenarios, and processes disclosed herein may be implemented. Examples of computing system 501 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 509. Processing system 502 is operatively coupled with storage system 503, communication interface system 507, and user interface system 509.

Processing system 502 loads and executes software 505 from storage system 503. Software 505 includes registration component 506, which is representative of the processes discussed with respect to the preceding FIGS. 1-4. When executed by processing system 502 to enhance impersonation, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and other circuitry that retrieves and executes software 505 from storage system 503. Processing system 502 may be implemented within a single processing device, but may also be distributed across multiple processing devices or sub-systems that cooperate in executing program instructions. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device, but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for implementing enhanced impersonation.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software, virtual machine software, or other application software, in addition to or that include registration component 506. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to facilitate enhanced impersonation. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 509 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 509. In some cases, the input and output devices may be combined in a single device, such as a display capable of displaying images and receiving touch gestures. The aforementioned user input and output devices are well known in the art and need not be discussed at length here.

User interface system 509 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface.

Communication between computing system 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Among other examples, the present disclosure presents systems comprising: one or more computer readable storage media; and program instructions stored on the one or more computer readable storage media that, when executed by at least one processor, cause the at least one processor to at least: receive a request at a service issued from a temporary account of the service accessed by a client application; determine whether the temporary account is stored in a mapping table comprising one or more temporary accounts mapped to a corresponding impersonation token; when it is determined that the temporary account is stored in the mapping table, identify the corresponding impersonation token mapped to the temporary account; and process the request in an impersonation mode based on the identified impersonation token. In further examples, the impersonation token grants an administrator access rights to a target account. In further examples, the impersonation mode configures the service to process the request as if the request is issued from the target account while granting the administrator access rights to the target account. In further examples, to process the request in the impersonation mode based on the identified impersonation token the program instructions, when executed by the at least one processor, further cause the at least one processor to exchange an authorization token associated with the temporary account with the identified impersonation token. In further examples, to process the request in the impersonation mode based on the identified impersonation token the program instructions, when executed by the at least one processor, further cause the at least one processor to configure a request execution engine to operate as an administrator impersonating a target user. In further examples, to process the request in the impersonation mode based on the identified impersonation token the program instructions, when executed by the at least one processor, further cause the at least one processor to configure a request execution engine to operate as a target user. In further examples, the client application is at least one of a mobile application, a sync client, a partner application, and a web application. In further examples, the access rights granted to the administrator include limited access to the target account.

Further aspects disclosed herein provide an exemplary computer-implemented method for impersonating a target account of a service accessed by a client application, the method comprising: receiving a request at the service issued from a temporary account of the service accessed by the client application; searching a mapping table for the temporary account, where the mapping table includes one or more temporary accounts mapped to a corresponding impersonation token; when the temporary account is identified in the mapping table, identifying the corresponding impersonation token mapped to the temporary account; and processing the request in an impersonation mode based on the identified impersonation token. In further examples, the impersonation token grants an administrator access rights to a target account. In further examples, the impersonation mode configures the service to process the request as if the request is issued from the target account while granting the administrator access rights to the target account. In further examples, processing the request in the impersonation mode based on the identified impersonation token comprises exchanging an authorization token associated with the temporary account with the identified impersonation token. In further examples, processing the request in the impersonation mode based on the identified impersonation token comprises configuring a request execution engine to operate as an administrator impersonating a target user. In further examples, processing the request in the impersonation mode based on the identified impersonation token comprises configuring a request execution engine to operate as a target user. In further examples, the client application is at least one of a mobile application, a sync client, a partner application, and a web application.

Additional aspects disclosed herein include a system comprising: at least one processor; and memory encoding computer executable instructions that, when executed by the at least one processor, perform a method for configuring a temporary account, the method comprising: receiving a request at a registration component for granting an administrator access rights to a target account of a service accessed by a client application; granting the administrator access rights to the target account; mapping a temporary account of the service to the target account having the associated administrator access rights; and storing the mapping between the temporary account and the target account having the associated administrator access rights in a mapping table of the registration component. In further examples, the method further comprises providing the temporary account to the administrator. In further examples, the method further comprises receiving a request at the service issued from the temporary account of the service via the client application; identifying the mapping between the temporary account and the target account with the associated administrator access rights in the mapping table of the registration component; and processing the request in an impersonation mode based on the identified mapping between the temporary account and the target account with the associated administrator access rights. In further examples, granting the administrator access rights to the target account comprises creating an impersonation token. In further examples, granting the administrator access rights to the target account comprises storing a mapping between the administrator and the target account that indicates the administrator has access rights to the target account.

Techniques for impersonating target user accounts via account redirection are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of impersonation systems that execute in conjunction with an application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A system comprising:
one or more computer readable storage media; and
program instructions stored on the one or more computer readable storage media that, when executed by at least one processor, cause the at least one processor to at least:
identify, at a service, a request for access to a target account associated with the service, wherein the request is issued from a temporary account associated with the service via a client application;
process the request to identify the temporary account;
search a mapping table to determine that the temporary account is stored therein;
identify, using the mapping table, an impersonation token associated with the temporary account, wherein the mapping table includes one or more temporary accounts mapped to corresponding impersonation tokens;
responsive to identifying the impersonation token, transition to an impersonation mode; and
process the request in the impersonation mode.

2. The system of claim 1, wherein the impersonation token grants an administrator access rights to the target account.

3. The system of claim 2, wherein the impersonation mode configures the service to process the request as if the request is issued from the target account while granting the administrator access rights to the target account.

4. The system of claim 1, wherein to process the request in the impersonation mode the program instructions, when executed by the at least one processor, further cause the at least one processor to exchange an authorization token associated with the temporary account with the identified impersonation token.

5. The system of claim 1, wherein to process the request in the impersonation mode the program instructions, when executed by the at least one processor, further cause the at least one processor to configure a request execution engine to operate as an administrator impersonating a target user associated with the target account.

6. The system of claim 1, wherein to process the request in the impersonation mode the program instructions, when executed by the at least one processor, further cause the at least one processor to configure a request execution engine to operate as a target user associated with the target account.

7. The system of claim 1, wherein the client application is at least one of a mobile application, a sync client, a partner application, and a web application.

8. The system of claim 2, wherein the access rights granted to the administrator include limited access to the target account.

9. A computer-implemented method of operating a system to impersonate a target account of a service accessed by a client application, the method comprising:
receiving, by the system, a request for access to a target account associated with the service, wherein the request is initiated by a temporary account of the service by the client application;
processing, by one or more processors of the system, the request to identify the temporary account;
searching, by the one or more processors of the system, a mapping table to determine that the temporary account is stored therein,
where the mapping table includes one or more temporary accounts mapped to corresponding impersonation tokens;
responsive to identifying the impersonation token, transition to an impersonation mode, and
process the request in the impersonation mode.

10. The computer-implemented method of claim 9, wherein the impersonation token grants an administrator access rights to the target account.

11. The computer-implemented method of claim 10, wherein the impersonation mode configures the service to process the request as if the request is issued from the target account while granting the administrator access rights to the target account.

12. The computer-implemented method of claim 9, wherein processing the request in the impersonation mode comprises exchanging an authorization token associated with the temporary account with the identified impersonation token.

13. The computer-implemented method of claim 9, wherein processing the request in the impersonation mode comprises configuring a request execution engine to operate as an administrator impersonating a target user associated with the target account.

14. The computer-implemented method of claim 9, wherein processing the request in the impersonation mode comprises configuring a request execution engine to operate as a target user associated with the target account.

15. The computer-implemented method of claim 9, wherein the client application is at least one of a mobile application, a sync client, a partner application, and a web application.

16. A system comprising:
reception means for receiving a request at a service issued from a temporary account of the service accessed by a client application;
storage means including one or more computer readable storage media for storing a mapping table including one or more temporary accounts mapped to corresponding impersonation tokens;
processing means including one or more processors for:
determining that a temporary account is stored in the mapping table;
identifying a corresponding impersonation token mapped to the temporary account; and
processing the request in an impersonation mode using the identified impersonation token.

17. The system of claim 16, wherein the impersonation token grants an administrator access rights to a target account, and wherein the impersonation mode configures the service to process the request as if the request is issued from the target account while granting the administrator access rights to the target account.

18. The system of claim 17, wherein the client application is at least one of a mobile application, a sync client, a partner application, and a web application and wherein the access rights granted to the administrator include limited access to the target account.

19. The system of claim 16, wherein the means for processing the request in the impersonation mode further comprises exchanging an authorization token associated with the temporary account with the identified impersonation token.

20. The system of claim 16, wherein the means for processing the request in the impersonation mode further comprises configuring a request execution engine to operate as an administrator impersonating a target user.

* * * * *